(12) United States Patent
Pearson et al.

(10) Patent No.: US 8,982,777 B1
(45) Date of Patent: *Mar. 17, 2015

(54) METHOD OF ADDING AND REMOVING SITES FOR A CLUSTER BASED ON A BASELINE DELAY COMPARISON

(71) Applicant: Sprint Communications Company, L.P., Overland Park, KS (US)

(72) Inventors: Timothy Hugh Pearson, Overland Park, KS (US); Steven Kenneth Guthrie, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/919,681

(22) Filed: Jun. 17, 2013

Related U.S. Application Data

(63) Continuation-in-part of application No. 13/868,642, filed on Apr. 23, 2013, which is a continuation-in-part of application No. 13/742,873, filed on Jan. 16, 2013.

(51) Int. Cl.
*H04B 7/212* (2006.01)
*H04J 3/06* (2006.01)
*H04W 56/00* (2009.01)

(52) U.S. Cl.
CPC .................................. *H04W 56/001* (2013.01)
USPC ............................ 370/324; 370/350; 370/503

(58) Field of Classification Search
USPC .................................................. 370/328–350
See application file for complete search history.

(56) References Cited

U.S. PATENT DOCUMENTS

| | | | |
|---|---|---|---|
| 8,416,763 B1* | 4/2013 | Montini et al. | 370/350 |
| 2006/0251084 A1* | 11/2006 | Elliot | 370/398 |
| 2007/0041324 A1* | 2/2007 | Shenoi | 370/235 |
| 2009/0296577 A1* | 12/2009 | Gusat et al. | 370/230.1 |
| 2011/0150008 A1* | 6/2011 | Le Pallec et al. | 370/503 |
| 2012/0057865 A1* | 3/2012 | Hasegawa et al. | 398/16 |
| 2013/0039359 A1* | 2/2013 | Bedrosian | 370/350 |
| 2013/0315265 A1* | 11/2013 | Webb et al. | 370/516 |
| 2014/0064303 A1* | 3/2014 | Aweya et al. | 370/509 |

* cited by examiner

*Primary Examiner* — Brandon Renner

(57) ABSTRACT

Systems, methods, and computer-readable media for adding and removing unanchored small cell sites for a cluster that delivers precision time protocol frequency and phase synchronization over a network without on-path support are provided. In embodiments, the method includes continuously measuring, in an asymmetric network without on-path support, an anchor path delay. A maximum standard allowable (MSA) delay variation is determined for the cluster. A respective round trip (RT) delay is continuously measured from the host site to each unanchored small cell site in the cluster. The anchor path delay is compared to each respective RT delay to determine a respective unanchored delay variation. In embodiments, unanchored small cell sites are be added to or removed from the cluster based on a comparison of a respective unanchored delay variation to the MSA delay variation.

10 Claims, 10 Drawing Sheets

| HOST CLOCK | UNANCHORED CLOCK | DCO | CORRECTIVE OFFSET | OFFSET CORRECTED TIME |
|---|---|---|---|---|
| 22 | 101 | | | |
| 23 | 102 | | | |
| 24 | 103 | 24 | -79 | 24 |
| 25 | 25 | | | 25 |
| 26 | 26 | | | 26 |
| 27 | 27 | | | 27 |
| 28 | 28 | | | 28 |
| 29 | 29 | 29 | 0 | 29 |
| 30 | 30 | | | 30 |
| 31 | 31 | | | 31 |

FIG. 4A

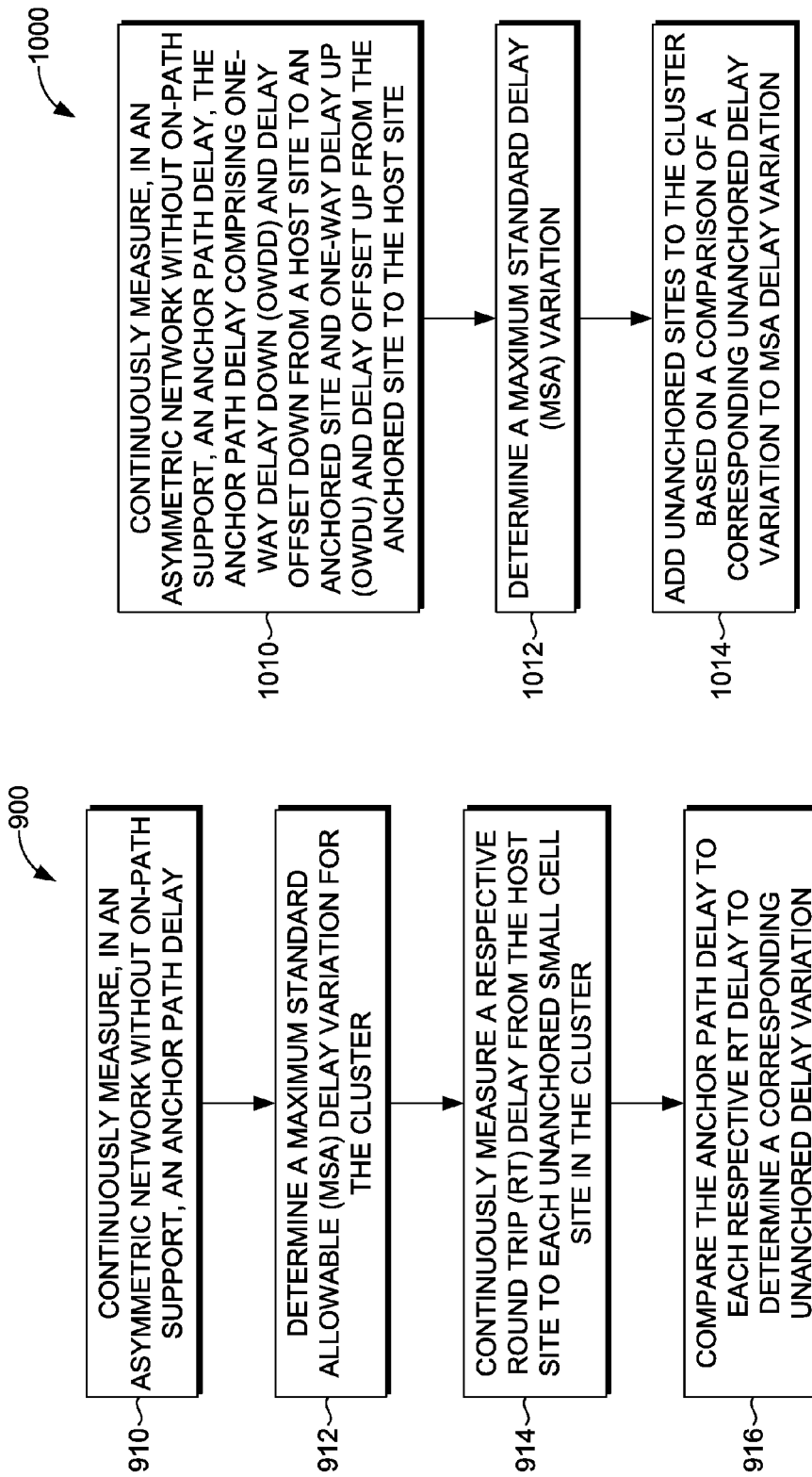

METHOD OF ADDING AND REMOVING SITES FOR A CLUSTER BASED ON A BASELINE DELAY COMPARISON

CROSS REFERENCE TO RELATED APPLICATIONS

This application is a continuation-in-part of U.S. patent application Ser. No. 13/868,642, filed on Apr. 23, 2013 and entitled "INCREASING ACCURACY FOR DELIVERING PRECISION TIME PROTOCOL FREQUENCY AND PHASE SYNCRHONIZATION OVER A NETWORK WITHOUT ON-PATH SUPPORT" which is a continuation-in-part of U.S. patent application Ser. No. 13/742,873, filed on Jan. 13, 2013 and entitled "DELIVERING PRECISION TIME PROTOCOL FREQUENCY AND PHASE SYNCRHONIZATION OVER A NETWORK WITHOUT ON-PATH SUPPORT", the entireties of which are hereby incorporated by reference.

SUMMARY

A high-level overview of various aspects of the invention is provided here for that reason, to provide an overview of the disclosure, and to introduce a selection of concepts that are further described in the detailed-description section below. This summary is not intended to identify key features nor essential features of the claimed subject matter, nor is it intended to be used as an aid in isolation to determine the scope of the claimed subject matter. In brief, and at a high level, this disclosure describes, among other things, adding sites to and removing sites from a cluster that provides precision time protocol (PTP) frequency and phase synchronization in asymmetric traffic-based networks without on-path support to unanchored sites in the cluster. In embodiments, an anchor path delay, in an asymmetric network without on-path support, is continuously measured. The anchor path delay may comprise one-way delay down (OWDd) and delay offset down from a host site to an anchored site and one-way delay up (OWDu) and delay offset up from the anchored site to the host site. A maximum standard allowable (MSA) delay variation is determined for the cluster. A respective round trip (RT) delay is continuously measured from the host site to each unanchored small cell site in the cluster. The anchor path delay is compared to each respective RT delay to determine a respective unanchored delay variation. In embodiments, unanchored small cell sites are be added to or removed from the cluster based on a comparison of a respective unanchored delay variation to the MSA delay variation.

BRIEF DESCRIPTION OF THE SEVERAL VIEWS OF THE DRAWINGS

Illustrative embodiments of the present invention are described in detail below with reference to the attached drawing figures, and wherein:

FIG. 4A is a one-step synchronization diagram depicting an illustrative one-step method for providing frequency and phase synchronization to unanchored sites over on-path supported networks, utilizing a host and anchored clock, in accordance with embodiments of the invention;

FIGS. 9 and 10 are flow diagrams depicting methods of adding and removing unanchored small cell sites for a cluster that delivers precision time protocol frequency and phase synchronization over a network without on-path support, in accordance with embodiments of the invention.

DETAILED DESCRIPTION

Figure 1:
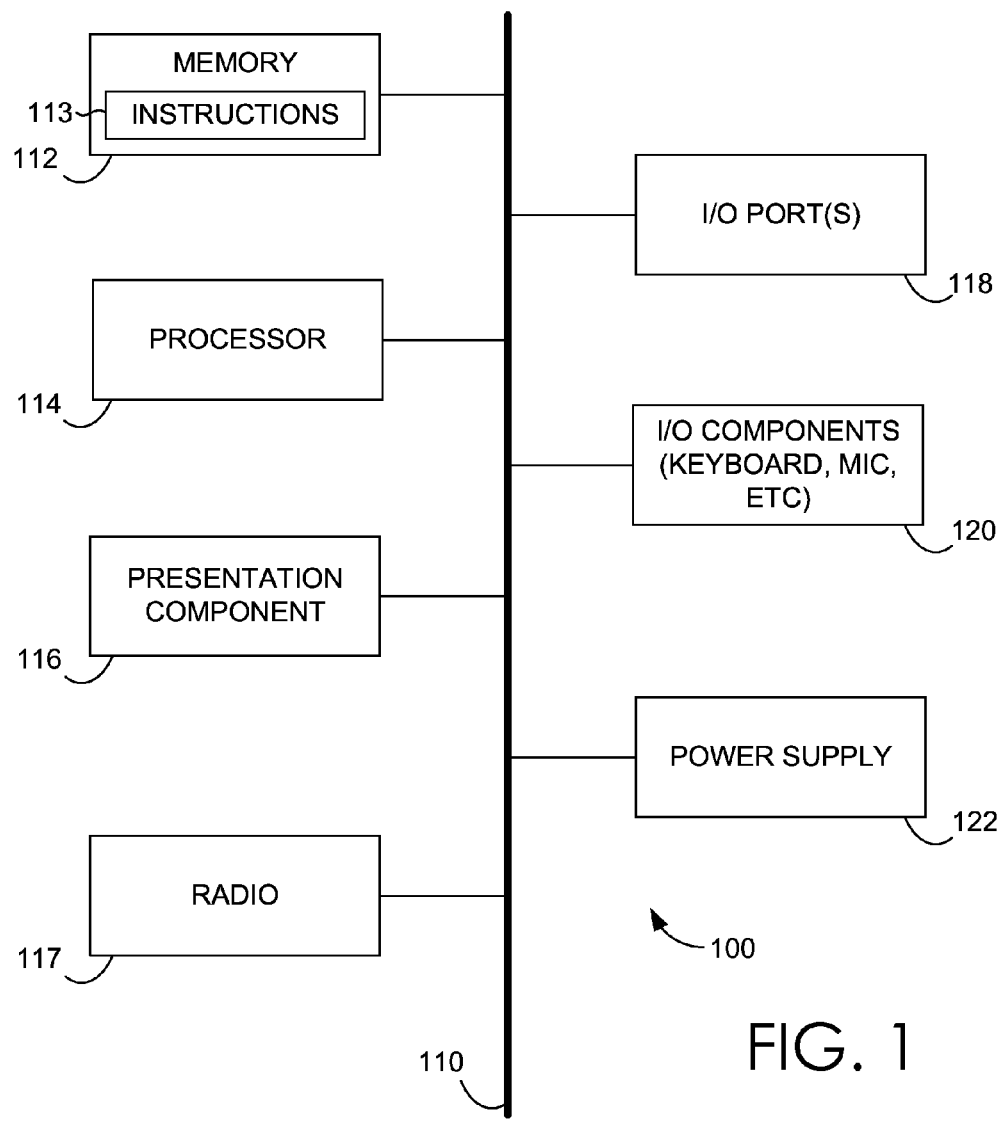
FIG. 1 depicts an illustrative device suitable for use in connection with embodiments of the invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

To address gaps in macro-network coverage (e.g., in buildings), to provide additional network capacity in congested areas, and for other reasons, macro-network service providers have begun installing and using devices referred to herein as small cells, which may also be referred to as femtocells, picocells, microcells, low-cost internet base stations (LCIBs), and by other names. Note that the aforementioned terms that end in "cell" may also be generally and herein used to refer to the coverage area provided by the respective device. Note also that "low-cost" is not used as a limiting term; that is, devices of any cost may be categorized as LCIBs, though most LCIBs typically will be much less expensive on average than most macro-network base stations.

A typical small cell may be approximately the size of a desktop phone or WiFi access point, and is essentially a low-power, low-capacity version of a macro base station. Thus, a typical small cell will use a normal power outlet, perhaps with a transformer providing a DC power supply. The small cell may have a wired (e.g., Ethernet) or wireless (e.g., WiFi) connection with the user's router, and would thus have connectivity to the Internet and/or one or more other packet-data networks via the user's broadband connection. A small cell may establish a virtual-private-network (VPN) connection over the Internet with an entity (e.g., a VPN terminator) on the wireless-service (macro-network) provider's core network, and thereby be able to securely communicate via the VPN terminator with other entities on that core network and beyond.

The small cell also has a wireless-communication (e.g., LTE or CDMA) interface that is compatible with the user's mobile station(s), such that the small cell may act as a micro base station, providing coverage on the wireless-service provider's network via the user's Internet connection. Usually, a small cell will provide service on a single RF carrier (or on a single carrier per technology, where multiple technologies (e.g., 1xRTT and EV-DO) are supported), and also transmit what is known as a pilot beacon, which includes administrative messages and parameters that mobile stations use to connect with the small cell.

In typical macro network implementations, Global Positioning System (GPS) receivers are installed at every macro base station for frequency and phase synchronization. But in the case of small cell deployment, synchronization may be problematic. In a Long Term Evolution (LTE) network, Coordinated Multi-point (CoMP) is needed for interference mitigation of small cells which are in close proximity to each other. Accordingly, CoMP requires extremely tight phase synchronization. Synchronization, as used herein, refers to the technique applied to ensure the radios in LTE small cell base stations are operating within specific performance parameters. Currently, the costs of deploying small cells with a GPS receiver are cost prohibitive. Further, locating small cells with GPS accessibility is not always possible.

Precision Time Protocol (PTP) IEEE-1588v2 supports both unicast and multicast messages to synchronize clocks thought a telecommunication network. PTP provides for frequency and phase synchronization, but to produce acceptable results requires some form of on-path support because dynamic asymmetric traffic-based networks vary in bidirectional delay. Such on-path support mechanisms are typically in the form of boundary and/or transparent clocks. This approach is generally effective in new installations (i.e., green-field approach), however is impractical and costly for existing networks (i.e., brown-field approach).

In simplified PTP systems, a grandmaster clock performs a discovery of all slave clocks and the synchronization alignment starts with the grandmaster clock. High precision is needed for telecom networks; therefore, PTP clock accuracy of sub-microsecond range is possible when the network traffic is fairly symmetric and has low delay. However, in packet-based networks, particularly in public IP networks, the traffic may be asymmetric and may have bursts of traffic which causes periods of higher delay. On-path support in the network helps mitigate the delay and filters out clocking noise, but IP public networks do not have clocking support.

Normally, slave clock manufacturers use a variety of proprietary methods and algorithms for determining useful PTP packets (i.e., packets that have reached their destination without undue delay). These slaves may achieve clock accuracy between the master and slave in the hundreds of nanoseconds. However, low Packet Delay Variation (PDV) and symmetry is necessary to produce extremely tight phase synchronization. In networks without on-path support, accuracy and locking of phase is not possible. Further exacerbating this problem is that many networks utilized by wireless providers are under other's control. Still further, each small cell site may have slightly different delay characterization. These slight differences may be caused by processing differences from edge to edge routers or switches. Unfortunately, even slight differences may prevent a particular small cell site from obtaining the correct frequency and phase synchronization.

Embodiments of the present invention are directed to improving accuracy for providing PTP frequency and phase synchronization to each unanchored small cell site in a cluster (e.g., small cell sites without GPS functionality) in asymmetric networks without PTP on-path support. In embodiments, one-way delay down (OWDd) and delay offset down from a host site to an anchored site and one-way delay up (OWDu) and delay offset up from the anchored site to the host site are continuously measured. Round trip (RT) delay from the host site to each unanchored small cell site in a cluster is continuously measured. A one-way delay down prime (OWDd') is determined for each unanchored site by applying the ratio of OWDu/OWDd to the corresponding RT delay for each unanchored small cell site. A respective adjusted dynamic corrective offset (DCO) is determined for each unanchored small cell site by adding the respective OWDd' for to the respective time stamp and the delay offset down. In embodiments, the respective adjusted DCO is applied to PTP messages communicated from the host site to the each unanchored small cell site in the cluster.

Accordingly, in one aspect, embodiments of the present invention are directed to one or more computer-readable storage media having computer-executable instructions embodied thereon that, when executed by a computing device, cause the computing device to facilitate a method for determining an adjusted dynamic corrective offset for each unanchored small cell site in a cluster. The method comprises: continuously measuring, in an asymmetric network without on-path support, one-way delay down (OWDd) and delay offset down from a host site to an anchored site and one-way delay up (OWDu) and delay offset up from the anchored site to the host site; continuously measuring a respective round trip (RT) delay from the host site to each unanchored small cell site in a cluster; determining a respective one-way delay down prime (OWDd') for each unanchored small cell site in the cluster by applying the ratio of OWDu/OWDd to the respective RT delay for each unanchored small cell site in the cluster; and determining a respective adjusted dynamic corrective offset (DCO) for each unanchored small cell site in the cluster by adding the respective OWDd' to the sum of a respective point in time and the delay offset down.

In another aspect, embodiments of the present invention are directed to a method for determining an adjusted dynamic corrective offset for each unanchored small cell site in a cluster. The method comprises: continuously measuring, in an asymmetric network without on-path support, one-way delay down (OWDd) and delay offset down from a host site to an anchored site and one-way delay up (OWDu) and delay offset up from the anchored site to the host site; continuously measuring a respective round trip (RT) delay from the host site to each unanchored small cell site in a cluster; determining a respective one-way delay down prime (OWDd') for each unanchored small cell site in the cluster by applying the ratio of OWDu/OWDd to the respective RT delay for each unanchored small cell site in the cluster; and determining a respective adjusted dynamic corrective offset (DCO) for each unanchored small cell site in the cluster by adding the respective OWDd' to the sum of a respective point in time and the delay offset down.

In yet another aspect, embodiments of the present invention are directed to a computer system for determining an adjusted dynamic corrective offset for each unanchored small cell site in a cluster. The computer system comprises a processor coupled to a computer-storage medium, the computer-storage medium having stored thereon a plurality of computer software components executable by the processor. The computer software components comprise: a delay component for continuously measuring, in an asymmetric network without on-path support, one-way delay down (OWDd) and delay offset down from a host site to an anchored site and one-way delay up (OWDu) and delay offset up from the anchored site to the host site to determine a respective adjusted dynamic corrective offset (DCO) for each unanchored small cell site in a cluster, wherein each of the host site and the anchored site has a Primary Reference Timing Clock (PRTC) that is traceable and synchronous to a common clock; a round trip component for continuously measuring a respective round trip (RT) delay from the host site to each unanchored small cell site in the cluster; an application component for applying the respective adjusted DCO to PTP messages communicated from the host site to each unanchored small cell site in the cluster; and a sync component for communicating, to each unanchored small cell site in the cluster, a PTP sync message that indicates a respective point in time the PTP sync message is communicated from the host site.

Further embodiments are directed to systems, methods, and computer-readable media for adding and removing unanchored small cell sites for a cluster that delivers precision time protocol frequency and phase synchronization over a network without on-path support discussed herein. In order to provide accurate precision time protocol frequency and phase synchronization over a network without on-path support, it is essential that each unanchored small cell site is within a MSA delay variation of the anchor path delay as measured between the host site and the anchored site. This MSA delay variation is based on the tolerance of the slave and the application of slave PTP tracking algorithms. Some asymmetric networks without PTP on-path support (e.g., public IP networks) may only have best effort (BE) traffic. In other words, the Committed Information Rate (CIR) is equal to zero and Excessive Information Rate (EIR) is greater than zero. BE data offerings are assigned for most public IP networks. Therefore, visibility into the specific network topology is not available, making assessments as to the allocations and design of a PTP non on-path supported cluster difficult.

Accordingly, one embodiment of the present invention is directed to computer-readable media having computer instructions embodied thereon that, when executed, facilitate a method of adding and removing unanchored small cell sites for a cluster that delivers PTP frequency and phase synchronization over a network without on-path support. The method comprises continuously measuring, in an asymmetric network without on-path support, an anchor path delay. A maximum standard allowable (MSA) delay variation is determined for the cluster. A respective round trip (RT) delay is continuously measured from the host site to each unanchored small cell site in the cluster. The anchor path delay is compared to each respective RT delay to determine a respective unanchored delay variation.

Another embodiment of the present invention is directed to a method of adding and removing unanchored small cell sites for a cluster that delivers precision time protocol frequency and phase synchronization over a network without on-path support. The method comprises continuously measuring, in an asymmetric network without on-path support, an anchor path delay. The anchor path delay comprises one-way delay down (OWDd) and delay offset down from a host site to an anchored site and one-way delay up (OWDu) and delay offset up from the anchored site to the host site. A maximum standard delay (MSA) variation is determined. Unanchored sites are added to the cluster based on a comparison of a respective unanchored delay variation to MSA delay variation.

Yet another embodiment of the present invention includes a computer system for adding and removing unanchored small cell sites for a cluster that delivers precision time protocol frequency and phase synchronization over a network without on-path support. The computer system comprises a processor coupled to a computer-storage medium, the computer-storage medium having stored thereon a plurality of computer software components executable by the processor. The computer software components comprise a delay component that continuously measures, in an asymmetric network without on-path support, an anchor path delay. The anchor path delay comprises one-way delay down (OWDd) and delay offset down from a host site to an anchored site and one-way delay up (OWDu) and delay offset up from the anchored site to the host site. Each of the host site and the anchored site has a Primary Reference Timing Clock (PRTC) that is traceable and synchronous to a common clock. A maximum standard allowable (MSA) delay variation component determines a MSA delay variation for the cluster. A round trip component continuously measures a respective round trip (RT) delay from the host site to each unanchored small cell site in the cluster. A comparison component compares the anchor path delay to each respective RT delay to determine a respective unanchored delay variation.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Telephone Technology |
| 4G | Fourth-Generation Wireless Telephone Technology |
| CDMA | Code Division Multiple Access |
| CD-ROM | Compact Disk Read Only Memory |
| CoMP | Coordinated Multi-Point |
| CRM | Customer Relations Management |
| CSR | Cell Site Router |
| DVD | Digital Versatile Discs |
| EEPROM | Electrically Erasable Programmable Read Only Memory |
| ENODEB | Evolved Node B |
| GPRS | General Packet Radio Service |
| GPS | Global Positioning System |
| GSM | Global System for Mobile Communications |
| HLR | Home Location Register |
| iDEN | Integrated Digital Enhanced Network |
| IP | Internet Protocol |
| LTE | Long Term Evolution |
| MSC | Mobile Serving Center |
| MMS | Multimedia Messaging Service |
| PDV | Packet Delay Variation |
| PC | Personal Computer |
| PCS | Personal Communications Service |
| PDA | Personal Digital Assistant |
| PLMN | Public Land Mobile Network |
| PRTC | Primary Reference Timing Clock |
| PTP | Precision Time Protocol |
| RAM | Random Access Memory |
| RF | Radio Frequency |
| ROM | Read Only Memory |
| SIB2 | SystemInformationBlockType2 |
| SLA | Service Level Agreement |
| SMS | Short Message Service |
| TDMA | Time Division Multiple Access |
| UCT | Coordinated Universal Time |

| | |
|---|---|
| UMTS | Universal Mobile Telecommunications Systems |
| VoIP | Voice over IP |
| WAN | Wide Area Network |
| Wi-Fi | Wireless Fidelity |
| WiMAX | Worldwide Interoperability for Microwave Access |

Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include media implemented in any method or technology that stores information. Examples of stored information include computer-useable instructions, data structures, program modules, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. In one embodiment, memory 112 includes a set of embodied computer-executable instructions 113 that, when executed, facilitate various aspects disclosed herein. These embodied instructions will variously be referred to as "instructions 113" or "application 113" for short.

Processor 114 might actually be multiple processors that receive instructions 113 and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include LTE, WiMAX, CDMA, GPRS, TDMA, GSM, Wi-Fi and the like. As can be appreciated, in various embodiments, radio 117 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
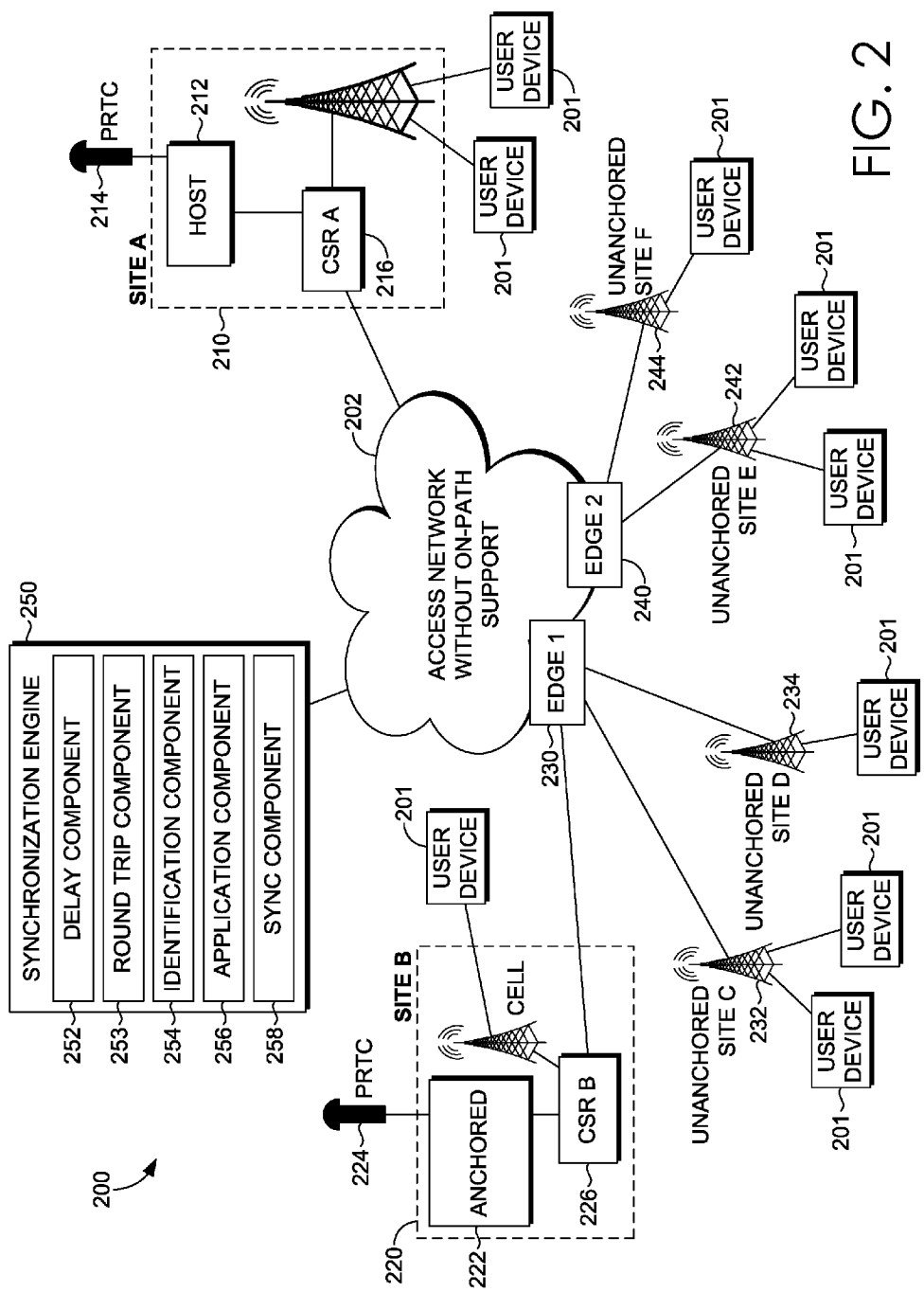
FIG. 2 is a schematic view of an exemplary network environment suitable for performing embodiments of the invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, network 202 enables communication between user devices 201 (e.g., mobile devices 100, servers, a personal computers, etc.). User devices 201 may take on a variety of forms, such as a personal computer (PC), a laptop computer, a tablet, a netbook, a mobile phone, a smart phone, a personal digital assistant (PDA), or any other device that is cable of communicating with other devices. For example, the user device 201 can take on any form, such as a mobile device 100 or any other computing device capable of wirelessly communicating with the other devices using the network. Makers of illustrative devices include, for example, Research in Motion, Creative Technologies Corp., Samsung, Apple Computer, and the like. A user device 201 can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device 201 can be any mobile computing device that communicates by way of, for example, a 3G or 4G network.

In embodiments, the network 202 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 202 can include multiple networks, as well as being a network of networks, but is shown in more simple form so as to not obscure other aspects of the present invention. The network 202 can be part of a telecommunication network that connects subscribers to their immediate service provider. In embodiments, the network 202 can be associated with a telecommunications provider that provides services to user devices 201. For example, the network 202 may provide voice services to user devices 201 or corresponding users that are registered or subscribed to utilize the services (e.g., the network 202) provided by a telecommunications provider. The network 202 can be any communication network providing voice and/or data service(s), such as, for example, a 1x circuit voice, a 3G network (e.g., CDMA, CDMA2000, WCDMA, GSM, UMTS), or a 4G network (WiMAX, LTE, HSDPA).

In embodiments, the network 202 is comprised of one or more edges (e.g., Edge 1 230 and Edge 2 240). The unanchored sites 232, 234, 242, 244 in the cluster and an anchored site 220 may be supported by one or more edges 230, 240. The unanchored sites 232, 234, 242, 244 in the cluster and anchored site 220 may be small cell sites which provide additional capacity and extend the range of the network 202 beyond what may be provided by a traditional macro cell tower. In one embodiment, the network 202 is an asymmetric network without PTP on-path support (e.g., public IP network). In other words, in one embodiment, the network 202 is not supported with transparent and/or boundary clocks. In one embodiment, the network 202 is an asymmetric network with PTP partial on-path support (e.g., one node includes a transparent clock).

The anchored site 220 is the only edge-supported site deployed with a PRTC 224 which is traceable and synchronous to a common clock. In one embodiment, the common clock is Coordinated Universal Time (UTC). In one embodiment, the PRTC 224 is a GPS receiver. This greatly reduces the costs associated with deploying edge-supporting small cell sites (i.e., the unanchored sites) and allows for deploying a GPS receiver at the edge-supporting site (e.g., LTE Pico cell) with the best available GPS line-of-sight. In one embodiment, one or more of the unanchored sites that are not deployed with an external clock that is traceable and synchronous to a common clock is deployed in an in-building environment. In one embodiment, more than one anchored site is deployed in a network 202 to support distinct edges associated with the network 202.

Host site 210 is also deployed with a PRTC 214, which is traceable and synchronous to a common clock. The host site 210 may be, for example, a macro cell found in a typical telecommunications network. In one embodiment, the PRTC is a GPS receiver. Each of the PRTCs 214, 224 allow for identical time synchronization between the host clock 212 and the anchored clock 222. This also allows for a very accurate measurement of OWDd and OWDu from the host site 210 to the anchored site 220. The RT delay can also be accurately measured from the host site 210 to each unanchored small cell site 232, 234, 242, 244 in the cluster. The known asymmetric ratio of OWDu/OWDd over the host site 210 to the anchored site 220 may be applied to each unanchored small cell site's RT delay to determine a respective OWDd'. The respective OWDd' can then be used to modify, as discussed herein, a typical PTP packet to synchronize each of the unanchored small cell sites 232, 234, 242, 244 in the cluster by using the standard PTP approach of one-way or two-way frequency only messaging. In one embodiment, a cell site router (CSR) 216, 226 aggregates the IP traffic within the cell site.

The unanchored sites 232, 234 242, 244 are usually positioned in clusters. The clusters may be located in an office building, a shopping mall, a stadium, or any other indoor or outdoor location to provide additional capacity or extended coverage to a macro network. The anchored site 220 may also be a small cell included as part of the cluster, with the location of the anchored site determined based on the availability of a GPS signal. The host site 210 may be a macro cell in a telecommunications network. The host site 210 will typically be the macro cell in proximity to the cluster, but remote host sites may also be used. In one embodiment, a host site 210 synchronizes with multiple clusters. In one embodiment, each cluster represents comprises one or more anchored sites and one or more associated unanchored sites. In one embodiment, the host site identifies a unique or separate adjusted DCO for each unanchored site in the cluster. For example, an office building may have a plurality of small cells with an anchored site and one or more unanchored sites. Each of the plurality of small cells may have a unique adjusted DCO. Similarly, office buildings in the proximate area will each have their own cluster of small cells. Each of the small cells in these clusters may have a unique adjusted DCO. A macro cell in the proximate area of the office buildings may serve as the host site 210 for a plurality of clusters.

In implementation, each of the sites is associated with a synchronization engine 250 that is utilized to provide PTP frequency and phase synchronization to unanchored sites over NoPS networks. The synchronization engine 250 includes, in various embodiments, delay component 252, roundtrip component 253, identification component 254, application component 256, and sync component 258. Although each of these components are illustrated as one synchronization engine 250 associated with the network 202, it should be appreciated that any or all of these components may be associated with any of the network elements, including host site 210 or the anchored site 220.

Delay component 252 continuously measures, in an asymmetric network without on-path support, OWDd and delay offset down from the host site 210 to the anchored site 220 and OWDu and delay offset up from the anchored site 220 to the host site 210 to determine a respective adjusted dynamic corrective offset (DCO) for each unanchored small cell site 232, 234, 242, 244 in a cluster, the respective adjusted DCO being unique for each unanchored small cell site in the cluster. In other words, because each unanchored small cell site may have a different RT delay, each unanchored small cell site may also have a different respective adjusted DCO. The delay offset down and the delay offset up account for processor time and/or additional delay required to align phase.

Round trip component 253 continuously measures a respective RT delay from the host site to each unanchored small cell site in the cluster. Because the network is asymmetric, it is often difficult, if not impossible, to determine the path required for communication between the host site 210 or anchored site 220 and each unanchored small cell site 232, 234, 242, 244 in the cluster. More particularly, a communication path with a particular unanchored small cell site may traverse more, less, or different routers than a communication path with another unanchored small cell site. Continuously measuring RT delay for each unanchored small cell site 232, 234, 242, 244 in the cluster allows for the determination of a more accurate adjusted DCO which, in turn, allows each unanchored small cell site 232, 234, 242, 244 in the cluster to correctly identify the correct PTP frames.

In one embodiment, identification component 254 uniquely identifies each site in the cluster, including both anchored and unanchored sites. The anchored site is the only site other than the host site that is deployed with a PRTC, which is traceable and synchronous to a common clock (e.g., UTC). Further, no boundary or transparent clocks are utilized in the PTP synchronization transport link or path. In one embodiment, each of the unanchored sites and anchored sites is identified by media access control (MAC) address. In one embodiment, each of the unanchored sites and anchored sites is identified by internet protocol (IP) address.

Application component 256 applies the respective adjusted DCO to PTP messages communicated from the host site to each unanchored small cell site in the cluster. As can be appreciated, in a public IP network, the adjusted DCO varies over time for each unanchored small cell site in the cluster based on a variety of factors, including the path distance, the path elements, and the path size required to reach each individual unanchored small cell site from the host site. By continuously measuring the OWDd, the OWDu, the RT delay, the delay offset up, and the delay offset down, the respective adjusted DCO can be individually (i.e., on a per unanchored small cell site basis) and frequently updated as necessary to maintain integrity in the clock synchronization process despite not having an external clock in any of the unanchored sites. In other words, the respective adjusted DCO allows the clocks associated with each of the unanchored small cell sites 232, 234, 242, 244 and the anchored site 220 to synchronize with the clock associated with the host site despite the absence of an external UTC traceable clocking source at unanchored sites 232, 234, 242, 244. Further, the respective adjusted DCO allows the clocks associated with each of the unanchored small cell sites 232, 234, 242, 244 and the anchored site 220 to synchronize with the clock associated with the host site despite the absence of an understanding of routing between each of the unanchored small cell sites 232, 234, 242, 244 and the anchored site 220 or host site 210.

In one embodiment (i.e., the one-step synchronization process), rather than communicating a PTP follow-up message, sync component 258 communicates, to the each unanchored small cell site in a cluster, a PTP sync message from the host site that indicates a respective point in time the PTP sync message is communicated form the host site. The PTP sync message also indicates the respective adjusted DCO in the {correction_field} of the PTP sync message.

In the one-step synchronization process embodiment, the two-step flag is set to false and a PTP follow-up message is not required. The respective adjusted DCO comprises a sum of the respective point in time, a respective OWDd', and the delay offset down. The respective OWDd' is determined for each unanchored small cell site in the cluster by applying the ratio of OWDu/OWDd to the respective RT delay. A respective corrective offset is determined for each unanchored small cell site in the cluster by subtracting the respective unanchored small cell site clock time at the respective receipt of the PTP synch message from the respective adjusted DCO. A respective offset correct time for each unanchored small cell site is then established by adding the respective corrective offset to the respective unanchored small cell clock time.

In one embodiment (i.e., the two-step synchronization process), sync component 258 communicates, to each unanchored small cell site in a cluster, a PTP sync message from the host site that indicates a respective point in time (i.e., a time stamp) the host site sent the sync message. Since the two-step flag is set to true, the {message_field} is ignored, in one embodiment, by each unanchored small cell site in the cluster. In this embodiment, sync component 258 further communicates, to each unanchored small cell site in the cluster, a PTP follow-up message from the host site that indicates the respective adjusted DCO in the {value_field} of the PTP follow-up message. The PTP sync message is received by each unanchored small cell site at a respective second point in time. The PTP follow-up message is received by each unanchored small cell site at a respective third point in time.

In the two-step synchronization process embodiment, the respective adjusted DCO comprises a sum of the respective point in time, a respective OWDd', and the delay offset down. The respective OWDd' is determined for each unanchored small cell site in the cluster by applying the ratio of OWDu/OWDd to the respective RT delay. A respective corrective offset is determined for each unanchored small cell site in the cluster by subtracting the respective adjusted DCO from the respective second point in time and a respective offset corrected time is determined for each unanchored small cell site in the cluster by adding the respective corrective offset to the respective third point in time.

Figure 3:
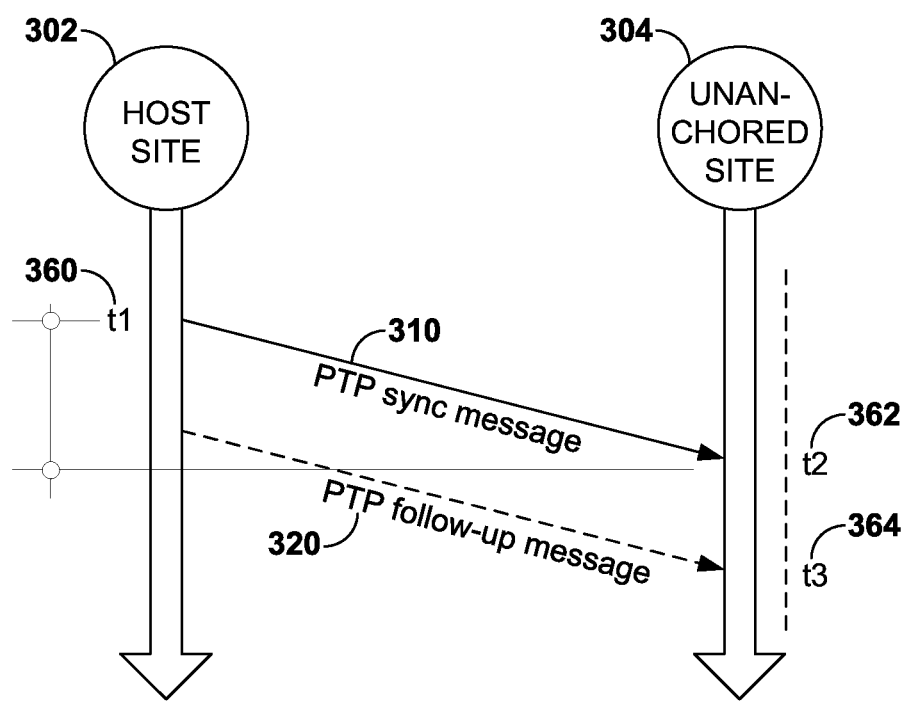
FIG. 3 is a diagram depicting an illustrative method for providing frequency and phase synchronization to unanchored sites over on-path supported networks, utilizing a host and anchored clock, in accordance with embodiments of the invention.

Referring now to FIGS. 2 and 3, in one embodiment, sync component 258 communicates, to the identified unanchored site 304, a PTP sync message 310 from the host site 302 that indicates a point in time 360 to an unanchored small cell site 304. In one embodiment, the two-step value is set to false (i.e., only sync message is sent), and the adjusted DCO is included in the {correction_field} of the PTP sync message. In one embodiment, the two-step value is set to true (i.e., sync and follow-up) and that point in time is ignored by the unanchored small cell site. The PTP sync message 310 is received by the unanchored small cell site 304 at a second point in time 362. In one embodiment, a follow-up message 320 from the host site 302 is communicated to the unanchored small cell site 304 indicating the adjusted DCO. The PTP follow-up message 320 is received by the unanchored small cell site 304 at a third point in time 364.

In implementation, and referring to FIG. 4A, a one-step synchronization diagram depicts PTP frequency and phase synchronization for each unanchored small cell site in a cluster over NoPS networks, utilizing a host and anchored clock, in accordance with embodiments of the invention.

At host clock 402 time twenty-two 410, a PTP sync message 412 is sent that includes a time stamp indicating a respective point in time the host clock communicates the PTP message. In this example, the time stamp corresponds to the host clock time of twenty-two 410. In one embodiment, the respective adjusted DCO is communicated as a value in the {correction_field} of the PTP sync message. The respective adjusted DCO comprises the sum of the time stamp, the OWDd', and the delay offset down (e.g., processor time and/or additional delay required to align phase). In this example, the OWDd' is 2 and delay offset down are 0. Thus, the sum of the time stamp (e.g., 22), the OWDd' (e.g., 2), and the delay offset down (i.e., 0) results in a respective adjusted DCO of twenty-four 422. The respective corrective offset 424 is calculated by subtracting the respective unanchored time 420 (e.g., 103) at the receipt of the PTP sync message from the respective adjusted DCO 422 (e.g., 24). In this example, the respective corrective offset 424 is negative seventy-nine.

The respective offset corrected time for the unanchored clock 404 is then established by adding the respective corrective offset 424 (e.g., −79) to the respective unanchored clock time 420 (e.g., 103). In this example, the respective offset corrected time is twenty-four 426. This process repeats to maintain frequency and phase synchronization with the host clock 402.

For example, the next PTP sync message 432 is communicated with a respective time-stamp indicating the host clock time of twenty-seven 430. The respective adjusted DCO is communicated as a value in the {correction_field} of the PTP sync message and comprises the sum of the time stamp (e.g., 27), the respective OWDd', and the delay offset down. In this example, the sum of the respective OWDd' and the delay offset down is still two resulting in a respective adjusted DCO of twenty-nine 442. The respective corrective offset 424 is calculated by subtracting the respective unanchored time 440 (e.g., 29) at the receipt of the PTP sync message from the respective adjusted DCO 442 (e.g., 29). In this example, the respective corrective offset 444 is zero.

The respective offset corrected time for the unanchored clock 404 is then established by adding the respective corrective offset 444 (e.g., 0) to the unanchored clock time 440 (e.g., 29). In this example, the respective offset corrected time is twenty-nine 446. This process repeats for each of the unanchored small cell sites in the cluster to maintain frequency and phase synchronization with the host clock 402. The respective offset corrected time is the synchronized time at the unanchored small cell site. As can be appreciated, this process is repeated any number of times for each unanchored small cell site in the cluster. As also can be appreciated, for any time delay changes associated with any of the unanchored small cell sites in the cluster, the clock associated with that particular unanchored small cell site will need to be corrected utilizing the above method.

Figure 4B:
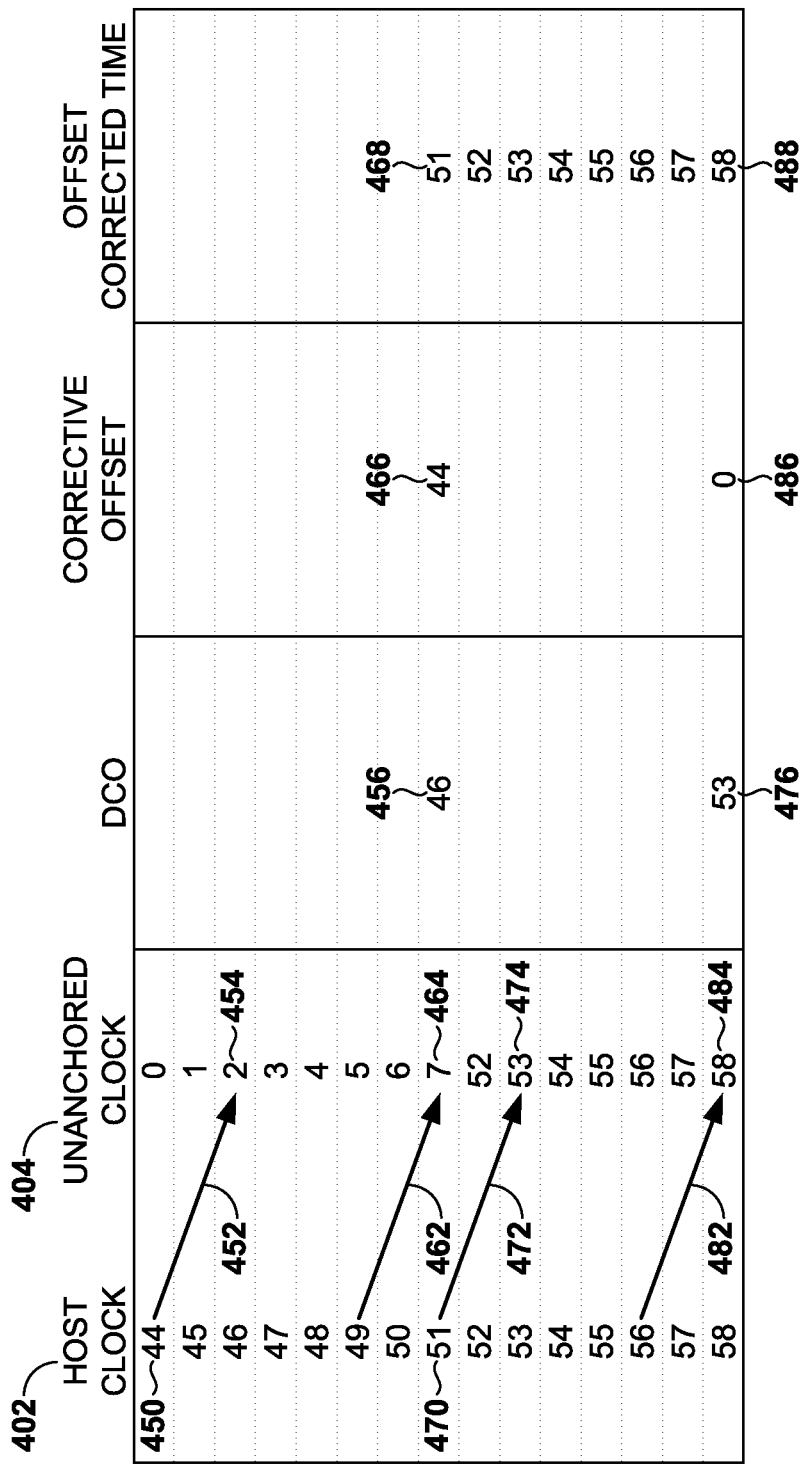
FIG. 4B is a two-step synchronization diagram depicting an illustrative two-step method for providing frequency and phase synchronization to unanchored sites over on-path supported networks, utilizing a host and anchored clock, in accordance with embodiments of the invention.

Referring now to FIG. 4B, a two-step synchronization diagram depicts PTP frequency and phase synchronization for unanchored small cell sites in a cluster over NoPS networks, utilizing a host and anchored clock, in accordance with embodiments of the invention. For purposes of this example, the respective OWDD' is two and the delay offset down is zero.

At host clock 402 time forty-four 450, a PTP sync message 452 is sent that includes a time stamp indicating a respective point in time the host clock communicates the PTP message (e.g., forty-four). In this example, the time stamp corresponds to the host clock time of forty-four 450 and is ignored by the unanchored small cell site. A follow-up message 462 is sent with the respective adjusted DCO which correlates to the same point in time as the PTP sync message 452. The respective adjusted DCO comprises the sum of the time stamp, the OWDd', and the delay offset down (i.e., processor time and/or additional delay required to align phase). In this example, the OWDd' is 2 and the delay offset down is 0. Thus, the sum of the respective time stamp (e.g., 44), the respective OWDd' (e.g., 2), the delay offset down (e.g., 0) results in a DCO of forty-six 456. Once the unanchored small cell site receives the follow-up message 462, the respective corrective offset 466 is computed for the unanchored clock 404. The respective corrective offset 466 is calculated by subtracting the unanchored time 454 (e.g., 2) at the receipt of the PTP sync message from the respective adjusted DCO (e.g., 46). In this example, the respective corrective offset 466 is forty-four.

The respective offset corrected time for the unanchored clock 404 is then established by adding the respective corrective offset 466 (e.g., 44) at the PTP follow-up message 462 to the unanchored clock time 464 (e.g., 7) when the PTP follow-up message 462 was received. In this example, the respective offset corrected time is fifty-one 468. This process repeats for each unanchored small cell site in the cluster to maintain respective frequency and phase synchronization with the host clock 402.

For example, the next PTP sync message 472 is sent at host clock time fifty-one 470. A PTP follow-up message 482 is also sent with a value of fifty-one. Utilizing the same respective OWDd' of two, the same delay offset down of zero, the respective adjusted DCO is calculated upon receiving the PTP follow-up message 484. In this example, the respective adjusted DCO is fifty-three 460. It should be appreciated, however, that the respective OWDd' is dynamic and may differ from the previous OWDd' associated with the PTP follow-up message 462. The respective corrective offset 486 is calculated by subtracting the unanchored time, fifty-three, at the receipt of the PTP sync message 472 (e.g., 424) from the respective adjusted DCO 476, also fifty-three. In this case the respective corrective offset 486 is zero. Finally, the respective offset corrected time for the unanchored clock 404 is calculated by adding the respective corrective offset 486 to the unanchored clock time 484 (e.g., 58) when the PTP follow-up message is received. In this example, zero is added to fifty-eight, making the respective offset corrected time fifty-eight. The respective offset corrected time is the synchronized time at the unanchored site. As can be appreciated, this process is repeated any number of times. As also can be appreciated, any time delay changes, the unanchored clock will need to be corrected utilizing the above method.

Figure 5:
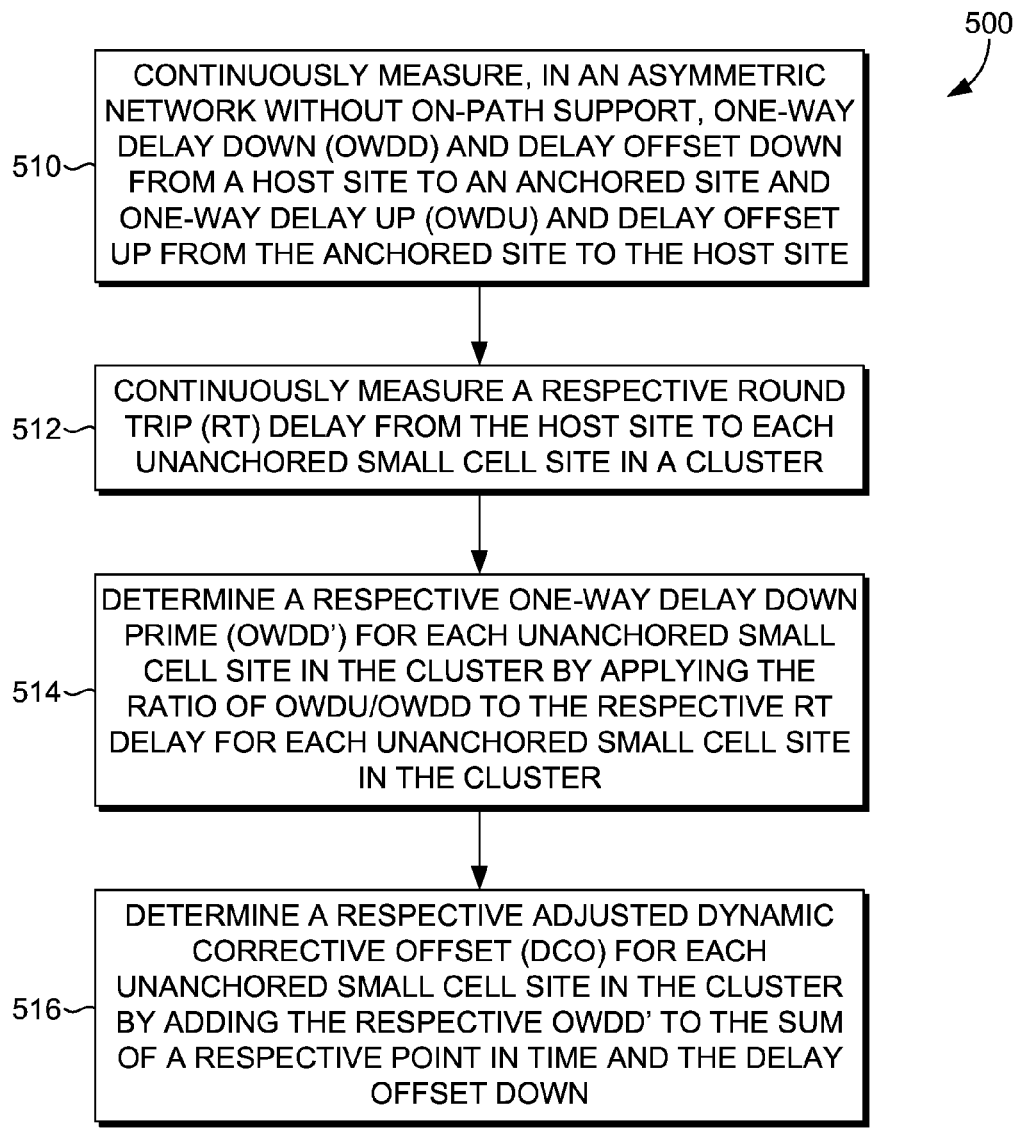
FIG. 5 is a flow diagram depicting an illustrative method for increasing the accuracy for providing PTP frequency and phase synchronization to unanchored sites over a network without on-path support, in accordance with embodiments of the invention.

Referring now to FIG. 5, a flow diagram depicts a method 500 for increasing the accuracy for providing PTP frequency and phase synchronization to unanchored sites over NoPS networks, in accordance with embodiments of the invention. At step 510, in an asymmetric network without on-path support, OWDd and delay offset down is continuously measured from a host site to an anchored site and OWDu and delay offset up is continuously measured from the anchored site to the host site. The delay offset down or up comprises processor delay and any necessary delay to account for phase shift. In one embodiment, each of the host site and the anchored site has a PRTC that is traceable and synchronous to a common clock. In one embodiment, the common clock is UTC. In one embodiment, the PRTC is a GPS receiver.

Respective RT delay is continuously measured, at step 512, from the host site to each unanchored small cell site in a cluster. In one embodiment, each of the unanchored sites is identified by MAC address. In one embodiment, each of the unanchored sites is identified by IP address. In one embodiment, a cluster comprises one or more anchored sites and one or more associated unanchored sites proximately positioned to each other. In one embodiment, a single host site synchronizes with multiple clusters.

At step 514, a respective OWDd' is determined for each unanchored small cell site in the cluster by applying the ratio of OWDu/OWDd to the respective RT delay for each unanchored small cell site in the cluster. A respective adjusted DCO is determined, at step 516, for each unanchored small cell site in the cluster by adding the respective OWDd' for each unanchored small cell site in the cluster to the sum of a respective point in time and the delay offset down. In one embodiment, the respective point in time corresponds to a time stamp associated with a PTP message. In one embodiment, the respective adjusted DCO for each unanchored small cell site in the cluster is applied to PTP messages communicated from the host site to the respective unanchored small cell site.

In a one-step synchronization embodiment, a two-step flag is set to false, indicating that a one-step synchronization process should be followed. In this embodiment, applying the respective adjusted DCO for each unanchored site in the cluster to PTP messages comprises communicating, from the host site to the each unanchored small cell site in the cluster, a PTP sync message from the host site that indicates, in the {correction_field} of the PTP sync message, the respective adjusted DCO. In one embodiment, a respective offset corrected time for each unanchored small cell site in the cluster is determined by adding the respective point in time to the respective adjusted DCO.

In a two-step synchronization embodiment, a flag is set to true indicating that a two-step synchronization process should be followed and each unanchored small cell site waits for a PTP follow-up message from the host site. In one embodiment, a PTP sync message is communicated from the host site to each unanchored small cell site in the cluster that indicates a respective point in time the host site sent the PTP sync message. The PTP sync message is received at a respective second point in time. It is indicated, to each unanchored small cell site in the cluster, to ignore the respective point in time indicated in the PTP sync message. A follow-up message is communicated to each unanchored small cell site in the cluster indicating the respective adjusted DCO. The PTP follow-up message is received by each unanchored small cell site in the cluster at a respective third point in time.

In one embodiment, a respective corrective offset is determined for each unanchored small cell site in the cluster by subtracting the respective adjusted second point in time from the respective adjusted DCO. An offset corrected time is determined for each unanchored small cell site in the cluster by adding the respective corrective offset to the respective third point in time. As can be appreciated, this process is repeated any number of times to accommodate any changes in respective adjusted DCO over time.

Figure 6:
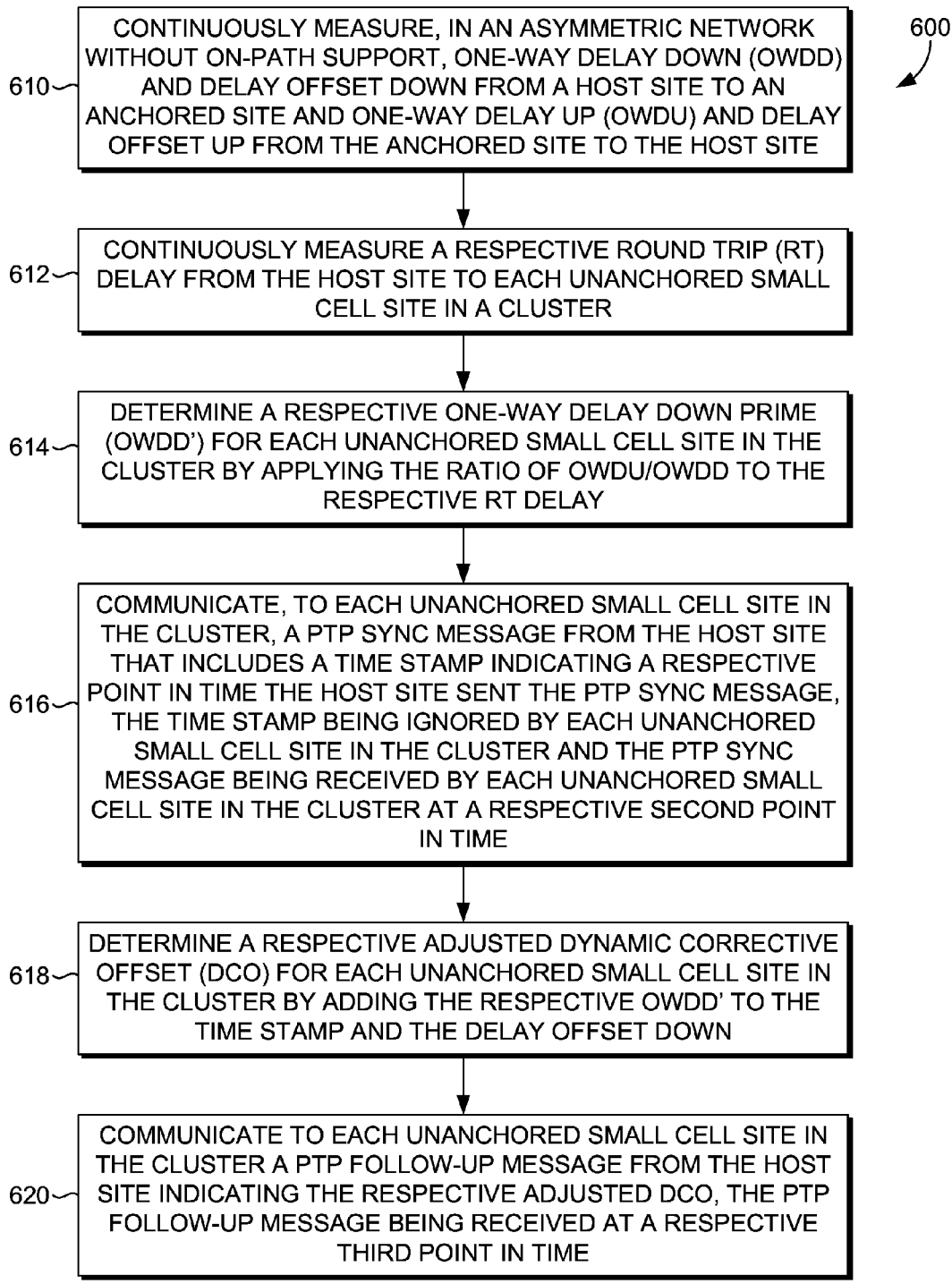
FIG. 6 is a flow diagram depicting an illustrative two-step method for increasing the accuracy for providing PTP frequency and phase synchronization to unanchored sites over a network without on-path support, in accordance with embodiments of the invention.

Referring now to FIG. 6, a flow diagram depicts an illustrative two-step method 600 for increasing the accuracy for providing PTP frequency and phase synchronization to unanchored sites over NoPS networks, in accordance with an embodiment of the present invention. Initially, at step 610, in an asymmetric network without on-path support, one-way delay down (OWDd) and delay offset down from a host site to an anchored site and one-way delay up (OWDu) and delay offset up from the anchored site to the host site are continuously measured. In one embodiment, each of the host site and the anchored site has a PRTC that is traceable and synchronous to a common clock. In one embodiment, the common clock is UTC.

At step 612, respective RT delay is continuously measured from the host site to each unanchored small cell site in a cluster. The unanchored sites do not include a PRTC that is traceable and synchronous to a common clock. Further, in one embodiment, no boundary or transparent clocks are utilized in the PTP synchronization process. In one embodiment, each of the unanchored sites is identified by MAC address. In one embodiment, each of the unanchored sites is identified by IP address.

At step 614, a respective one-way delay down prime (OWDd') is determined for each unanchored small cell site in the cluster by applying the ratio of OWDu/OWDd to the respective RT delay. A PTP sync message is communicated, at step 616, from the host site to each unanchored small cell site in the cluster. The PTP sync message includes a time stamp indicating a respective point in time the host site sent the PTP sync message. The time stamp is ignored by each unanchored small cell site in the cluster. The PTP sync message is received by each unanchored small cell site in the cluster at a respective second point in time.

At step 616, a respective adjusted DCO is determined for each unanchored small cell site in the cluster by adding the respective OWDd' to the time stamp and the delay offset down. A PTP follow-up message is communicated from the host site to each unanchored small cell site in the cluster at step 618. The PTP follow-up message indicates the respective adjusted DCO. The PTP follow-up message is received by each unanchored small cell site at a respective third point in time. In one embodiment, additional PTP sync and follow-up messages are sent in the same fashion to each unanchored small cell site to maintain PTP frequency and phase synchronization.

In one embodiment, a respective corrective offset is determined by subtracting the respective second point in time from the respective adjusted DCO. In one embodiment, a respective offset corrected time is determined for the each unanchored small cell site by adding the respective corrective offset to the respective third point in time. As can be appreciated, this process is repeated any number of times to accommodate PTP frequency and phase synchronization of the unanchored sites to the host.

Figure 7:
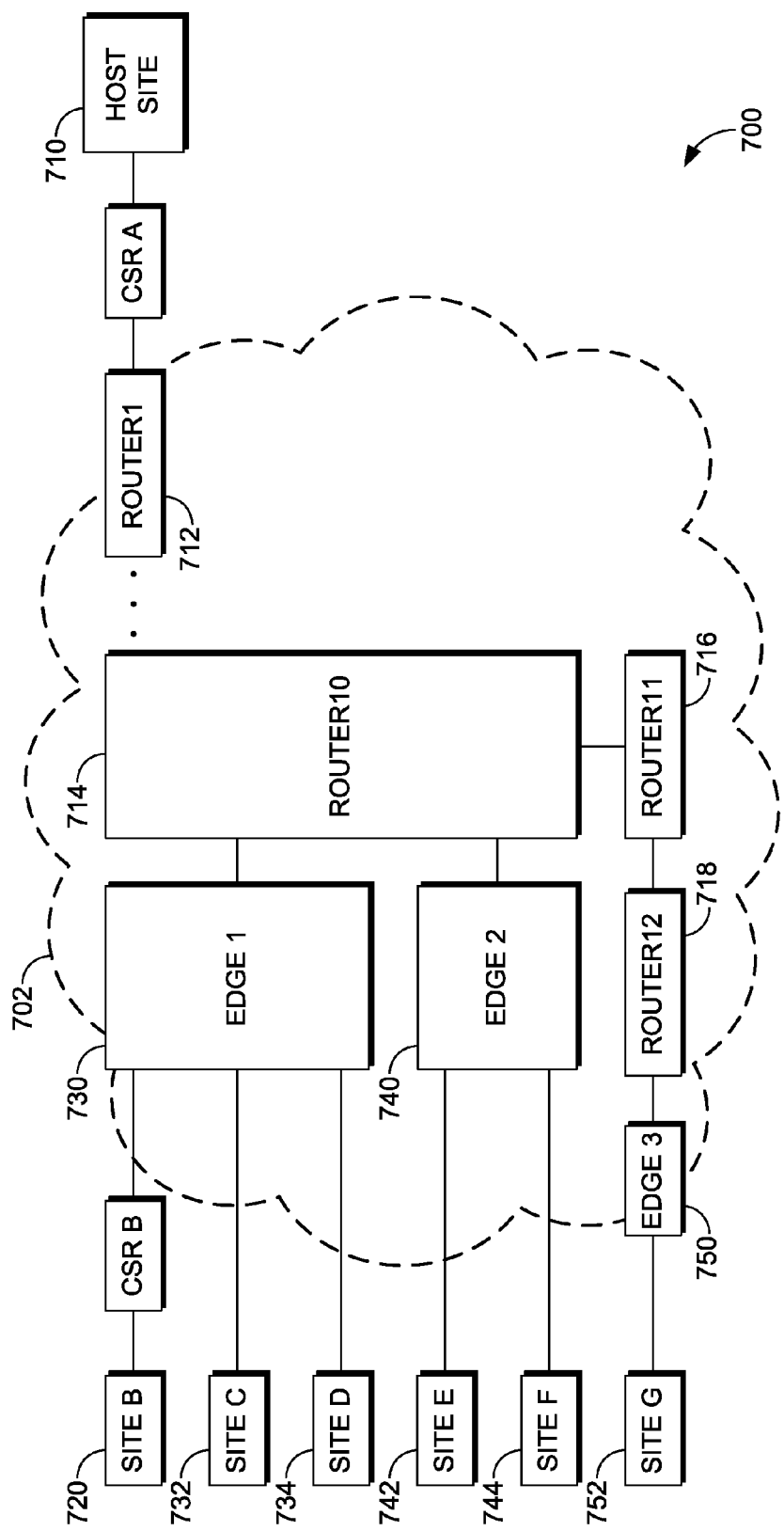
FIG. 7 is a schematic view of a network without on-path support.

As indicated previously, further embodiments are systems, methods, and computer-readable media for adding and removing unanchored small cell sites for a cluster that delivers precision time protocol frequency and phase synchronization over a network without on-path support. Referring now to FIG. 7, a schematic view 700 of network without on-path support 702 is illustrated. Host site 710 and anchored site 720 support the PTP frequency and phase synchronization of the unanchored sites 732, 734, 742, 744, 752 in the cluster as described herein. As illustrated, for each of the unanchored sites 732, 734, 742, 744 at edge 1 730 and edge 2 740, respectively, the path of the host site 710 to each unanchored site 732, 734, 742, 744 may go through similar networks elements, such as router1 712 through router10 714. However, PTP frequency and phase synchronization for unanchored site 752 at edge 3 750 may require an additional communication path through router11 716 and router12 718. Because of this additional communication path, delay variation for this unanchored site 752 may be greater than can be tolerated by the PTP slave at unanchored site 752, reducing or potentially preventing the accuracy of the PTP frequency and phase synchronization. Accordingly, unanchored site 752 may not be a suitable candidate unanchored site for this particular cluster. As such, unanchored site 752 may be removed from the cluster, installed with GPS to become an anchored site in a new cluster, or added to a cluster where the delay variation is reduced to an acceptable level.

Figure 8:
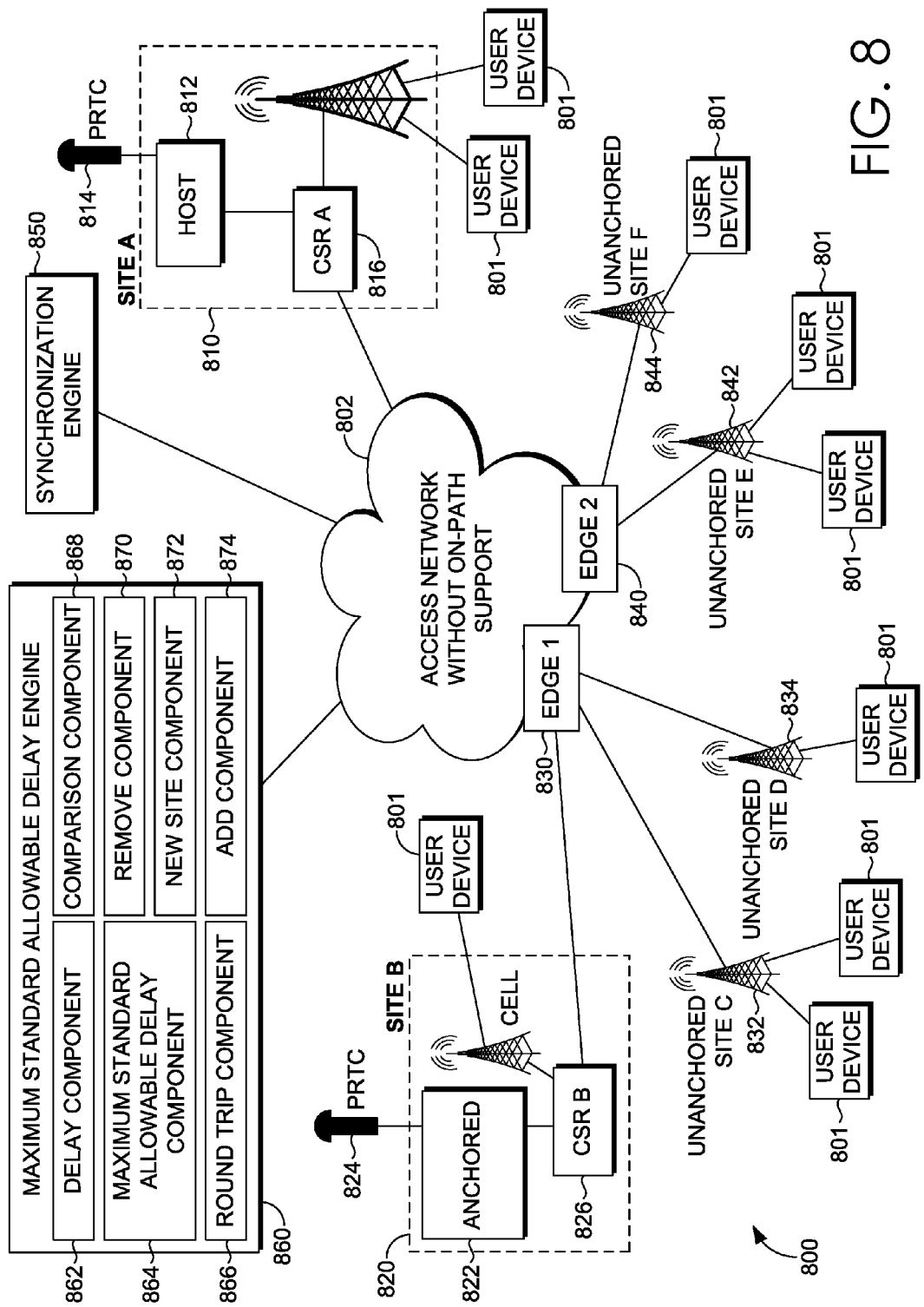
FIG. 8 is a schematic view of an exemplary network environment suitable for performing embodiments of the invention.

FIG. 8 provides an exemplary network environment suitable for performing embodiments of the invention. Such a network environment is illustrated and designated generally as network environment 800. Network environment 800 is but one example of a suitable network environment and is not intended to suggest any limitation as to the scope of use or functionality of the invention. Neither should the network environment be interpreted as having any dependency or requirement relating to any one or combination of components illustrated.

It should be understood that any number of synchronization engines 850, maximum standard allowable (MSA) delay engines 860, user devices 801, host sites 812, anchored sites 822, or unanchored sites 832, 834, 842, 844 may be employed in the computing system 800 within the scope of embodiments of the present invention. Each may comprise a single device/interface or multiple devices/interfaces cooperating in a distributed environment. For instance, the MSA delay engine 860 may comprise multiple devices and/or modules arranged in a distributed environment that collectively provide the functionality of the MSA delay engine 860 described herein. Additionally, other components or modules not shown also may be included within the computing system 800.

In some embodiments, one or more of the illustrated components/modules may be implemented as stand-alone applications. In other embodiments, one or more of the illustrated components/modules may be implemented via the synchronization engine 850, the MSA delay engine 860, user devices 801, host site 812, anchored site 822, or unanchored sites 832, 834, 842, 844. It will be understood by those of ordinary skill in the art that the components/modules illustrated in FIG. 8 are exemplary in nature and in number and should not be construed as limiting. Any number of components/modules may be employed to achieve the desired functionality within the scope of embodiments hereof. Further, components/modules may be located on and/or shared by any number of synchronization engines 850 and MSA delay engines 860. By way of example only, the maximum standard allowable delay engine 860 might be provided as a single computing device (as shown), a cluster of computing devices, or a computing device remote from one or more of the remaining components. As another example, the synchronization engine 850 and the MSA delay engine 860 could be provided together on a single computing device, a cluster of computing devices, or a computing device remote from one or more of the remaining components. Additionally, the synchronization engine 850 and the MSA delay engine 860 may be provided by a single entity or multiple entities. Any and all such variations are contemplated to be within the scope of embodiments herein.

In the network environment 800, network 802 enables communication between user devices 801 (e.g., mobile devices 100, servers, a personal computers, etc.). User devices 801 may take on a variety of forms, such as a personal computer (PC), a laptop computer, a tablet, a netbook, a mobile phone, a smart phone, a personal digital assistant (PDA), or any other device that is cable of communicating with other devices. For example, the user device 801 can take on any form, such as a mobile device 100 or any other computing device capable of wirelessly communicating with the other devices using the network. Makers of illustrative devices include, for example, Research in Motion, Creative Technologies Corp., Samsung, Apple Computer, and the like. A user device 801 can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device 801 can be any mobile computing device that communicates by way of, for example, a 3G or 4G network.

In embodiments, the network 802 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 802 can include multiple networks, as well as being a network of networks, but is shown in more simple form so as to not obscure other aspects of the present invention. The network 802 can be part of a telecommunication network that connects subscribers to their immediate service provider. In embodiments, the network 802 can be associated with a telecommunications provider that provides services to user devices 801. For example, the network 802 may provide voice services to user devices 801 or corresponding users that are registered or subscribed to utilize the services (e.g., the network 802) provided by a telecommunications provider. The network 802 can be any communication network providing voice and/or data service(s), such as, for example, a 1x circuit voice, a 3G network (e.g., CDMA, CDMA2000, WCDMA, GSM, UMTS), or a 4G network (WiMAX, LTE, HSDPA).

In embodiments, the network 802 is comprised of one or more edges (e.g., Edge 1 830 and Edge 2 840). The unanchored sites 832, 834, 842, 844 in the cluster and an anchored site 820 may be supported by one or more edges 830, 840. The unanchored sites 832, 834, 842, 844 in the cluster and anchored site 820 may be small cell sites which provide additional capacity and extend the range of the network 802 beyond what may be provided by a traditional macro cell tower. In one embodiment, the network 802 is an asymmetric network without PTP on-path support (e.g., public IP network). In other words, in one embodiment, the network 802 is not supported with transparent and/or boundary clocks. In one embodiment, the network 802 is an asymmetric network with PTP partial on-path support (e.g., one node includes a transparent clock).

The anchored site 820 is the only edge-supported site deployed with a PRTC 824 which is traceable and synchronous to a common clock. In one embodiment, the common clock is Coordinated Universal Time (UTC). In one embodiment, the PRTC 824 is a GPS receiver. This greatly reduces the costs associated with deploying edge-supporting small cell sites (i.e., the unanchored sites) and allows for deploying a GPS receiver at the edge-supporting site (e.g., LTE Pico cell) with the best available GPS line-of-sight. In one embodiment, one or more of the unanchored sites that are not deployed with an external clock that is traceable and synchronous to a common clock is deployed in an in-building environment. In one embodiment, more than one anchored site is deployed in a network 802 to support distinct edges associated with the network 802.

Host site 810 is also deployed with a PRTC 814, which is traceable and synchronous to a common clock. The host site 810 may be, for example, a macro cell found in a typical telecommunications network. In one embodiment, the PRTC 814 is a GPS receiver. Each of the PRTCs 814, 824 allow for identical time synchronization between the host clock 812 and the anchored clock 822. This also allows for a very accurate measurement of OWDd and OWDu from the host site 810 to the anchored site 820. The RT delay can also be accurately measured from the host site 810 to each unanchored small cell site 832, 834, 842, 844 in the cluster. The known asymmetric ratio of OWDu/OWDd over the host site 810 to the anchored site 820 may be applied to each unanchored small cell site's RT delay to determine a respective OWDd'. The respective OWDd' can then be used to modify, as discussed herein, a typical PTP packet to synchronize each of the unanchored small cell sites 832, 834, 842, 844 in the cluster by using the standard PTP approach of one-way or two-way frequency only messaging. In one embodiment, a cell site router (CSR) 816, 826 aggregates the IP traffic within the cell site.

The unanchored sites 832, 834 842, 844 are usually positioned in clusters. The clusters may be located in an office building, a shopping mall, a stadium, or any other indoor or outdoor location to provide additional capacity or extended coverage to a macro network. The anchored site 820 may also be a small cell included as part of the cluster, with the location of the anchored site determined based on the availability of a GPS signal. The host site 810 may be a macro cell in a telecommunications network. The host site 810 will typically be the macro cell in proximity to the cluster, but remote host sites may also be used. In one embodiment, a host site 810 synchronizes with multiple clusters. In one embodiment, each cluster represents comprises one or more anchored sites and one or more associated unanchored sites. In one embodiment, the host site identifies a unique or separate adjusted DCO for each unanchored site in the cluster. For example, an office building may have a plurality of small cells with an anchored site and one or more unanchored sites. Each of the plurality of small cells may have a unique adjusted DCO. Similarly, office buildings in the proximate area will each have their own cluster of small cells. Each of the small cells in these clusters may have a unique adjusted DCO. A macro cell in the proximate area of the office buildings may serve as the host site 810 for a plurality of clusters.

The synchronization engine 850 may be similar to the synchronization engine 250 discussed above with reference to FIG. 2. Additionally, the synchronization engine 850 may include a number of components (delay component, round trip component, identification component, application component, and sync component) and operate in a manner similar to that described above with reference to FIG. 2. As such, details of these components of FIG. 8 with reference to FIG. 2 will not be described in further detail here.

As described above with respect to FIG. 7, in an asymmetric network without on-path support (e.g., public IP network), visibility of network elements that may be utilized in a particular communication path between various sites (i.e., such as the path required for PTP frequency and phase synchronization between the host site and an unanchored small cell site) is not always available. Accordingly, unanchored small cell sites may be added to clusters where the tolerance of the PTP slave for a particular unanchored small cell site is exceeded. In this instance, accurate PTP frequency and phase synchronization may not be possible for that unanchored small cell site in that particular cluster.

For example, each of unanchored sites 832, 834, 842, 844 may utilize different network elements to communicate with the host site 810 (i.e., different or additional routers as described above). Accordingly, one or more of the unanchored sites 832, 834, 842, 844 may not achieve accurate PTP frequency and phase synchronization in the cluster as illustrated. One or more of these unanchored sites 832, 834, 842, 844 may be better suited in another cluster or may be a candidate to be installed with a PRTC to become an anchored site in another cluster. The MSA delay engine 860, described below, helps determine which unanchored sites should be added or removed from a cluster.

In implementation, each of the sites is associated with MSA delay engine 860 that is utilized for adding and removing unanchored small cell sites for a cluster that delivers precision time protocol frequency and phase synchronization over a network without on-path support. The MSA delay engine 860 includes, in various embodiments, delay component 862, MSA delay component 864, round trip (RT) component 866, comparison component 868, remove component 870, new site component 872, and add component 874. Although each of these components are illustrated as one MSA delay engine 860 associated with the network 802, it should be appreciated that any or all of these components may be associated with or shared by any of the network elements, including host site 810, the anchored site 820, or synchronization engine 850.

Delay component 862 continuously measures, in an asymmetric network without on-path support, an anchor path delay. The anchor path delay comprises one-way delay down (OWDd) and delay offset down from a host site 812 to an anchored site 814 and one-way delay up (OWDu) and delay offset up from the anchored site 814 to the host site 812. Each of the host site 812 and the anchored site 842 has a PRTC 814, 824 that is traceable and synchronous to a common clock.

MSA delay component 864 determines a MSA delay variation for the cluster. The MSA delay variation represents the maximum amount of delay variation the PTP slave at an unanchored small cell site can tolerate and still achieve accurate frequency and phase synchronization. The MSA delay variation may vary from cluster to cluster, even in clusters sharing the same host site.

RT component 866 continuously measures a respective round trip (RT) delay from the host site to each unanchored small cell site in the cluster. Because the network is asymmetric, it is often difficult, if not impossible, to determine the path required for communication between the host site 810 or anchored site 820 and each unanchored small cell site 832, 834, 842, 844 in the cluster. More particularly, a communication path with a particular unanchored small cell site may traverse more, less, or different routers than a communication path with another unanchored small cell site. Continuously measuring RT delay for each unanchored small cell site 832, 834, 842, 844 in the cluster allows for the determination of whether or not the MSA delay variation is exceeded for a particular unanchored small cell site. Exceeding the MSA delay variation may reduce the likelihood or prevent an accurate adjusted DCO which may prevent the unanchored small cell site 832, 834, 842, 844 in the cluster from correctly identify the correct PTP frames. An unanchored small cell site 832, 834, 842, 844 that cannot correctly identify the correct PTP frames cannot accurately achieve PTP frequency and phase synchronization.

Comparison component 868 compares the anchor path delay to each respective RT delay to determine a respective unanchored delay variation. If the respective unanchored delay variation is within a certain threshold (i.e., does not exceed the MSA delay variation), then that particular unanchored small cell site should be able to achieve accurate PTP frequency and phase synchronization while in the cluster. In one embodiment, remove component 870 removes any unanchored small cell site from the cluster whose respective unanchored delay variation exceeds the MSA delay variation.

In one embodiment, new site component 872 identifies a new unanchored site to add to the cluster. A new RT delay is received from the RT component 866. The new RT delay is continuously measured from the host site to the new unanchored site. The comparison comment 868 compares the anchor path delay to the new RT delay to determine the new unanchored delay variation. In one embodiment, add component 874 adds the new site to the cluster if the new unanchored delay variation does not exceed the MSA delay variation and does not add the new site to the cluster if the unanchored delay variation exceeds the MSA delay variation.

Referring now to FIG. 9, a flow diagram depicts an illustrative method 900 for adding and removing unanchored small cell sites for a cluster that delivers precision time protocol frequency and phase synchronization over a network without on-path support, in accordance with an embodiment of the present invention. Initially, at step 910, an anchor path delay is continuously measured in an asymmetric network without on-path support. In one embodiment, the anchor path delay comprises one-way delay down (OWDd) and delay offset down from a host site to an anchored site and one-way delay up (OWDu) and delay offset up from the anchored site to the host site.

A maximum standard allowable (MSA) delay variation for the cluster is determined at step 912. The MSA delay variation represents the maximum amount of delay variation the PTP slave at an unanchored small cell site can tolerate and still achieve accurate frequency and phase synchronization. The MSA delay variation may vary from cluster to cluster, even in clusters sharing the same host site.

A respective round trip (RT) delay from the host site to each unanchored small cell site in the cluster is continuously measured at step 914. At step 916, the anchor path delay is compared to each respective RT delay to determine a respective unanchored delay variation. In one embodiment, the anchor path delay and the respective RT delay that are compared are measured simultaneously. In other words, the delay variation measurements that are compared are taken at approximately the same time.

In one embodiment, any unanchored small cell site whose respective unanchored delay variation exceeds the MSA delay variation is removed from the cluster. In one embodiment, a Primary Reference Timing Clock (PRTC) that is traceable and synchronous to a common clock is added to at least one of the removed unanchored small cell sites to form a new anchored site for a new cluster.

In one embodiment, a new unanchored site is identified to add to the cluster. In one embodiment, a new RT delay from the host site to the new unanchored site is continuously measured. In one embodiment, the anchor path delay is compared to the new RT delay to determine the new unanchored delay variation. In one embodiment, the new site is added to the cluster if the new unanchored delay variation does not exceed the MSA delay variation. In one embodiment, the new site is not added to the cluster if the new unanchored delay variation exceeds the MSA delay variation.

Referring now to FIG. 10, a flow diagram depicts an illustrative method 1000 for adding and removing unanchored small cell sites for a cluster that delivers precision time protocol frequency and phase synchronization over a network without on-path support, in accordance with an embodiment of the present invention. Initially, at step 1010, an anchor path delay is continuously measured, in an asymmetric network without on-path support. The anchor path delay comprises OWDd and delay offset down from a host site to an anchored site and OWDu and delay offset up from the anchored site to the host site.

At step 1012, a MSA delay variation is determined. The MSA delay variation represents the maximum amount of delay variation the PTP slave at an unanchored small cell site can tolerate and still achieve accurate frequency and phase synchronization. The MSA delay variation may vary from cluster to cluster, even in clusters sharing the same host site.

Unanchored sites are added to the cluster, at step 1014, based on a comparison of a respective unanchored delay variation to MSA delay variation. In one embodiment, a respective round trip (RT) delay from the host site to each unanchored small cell site is continuously measured. The respective unanchored delay variation may be determined by comparing the anchor path delay to each respective RT delay. Each of the anchor path delay and the respective RT delay measurements taken at approximately the same time. In one embodiment, unanchored small cell sites are added to the cluster if the respective unanchored delay variation does not exceed the MSA delay variation. In one embodiment, unanchored sites are not added to the cluster if the respective unanchored delay variation exceeds the MSA delay variation.

Many different arrangements of the various components depicted, as well as components not shown, are possible without departing from the scope of the claims below. Embodiments of our technology have been described with the intent to be illustrative rather than restrictive. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need to be carried out in the specific order described.

The invention claimed is:

1. Non-transitory computer-readable media having computer-executable instructions embodied thereon that, when executed by one or more computing devices, cause the one or more computing devices to perform operations comprising:
   continuously measuring, in an asymmetric network without on-path support, an anchor path delay;
   determining a maximum standard allowable (MSA) delay variation for a cluster;
   continuously measuring a respective round trip (RT) delay from a host site to each unanchored small cell site in the cluster;
   comparing the anchor path delay to each respective RT delay to determine a respective unanchored delay variation;
   identifying a new unanchored site to add to the cluster;
   continuously measuring a new RT delay from the host site to the new unanchored site;
   comparing the anchor path delay to the new RT delay to determine a new unanchored delay variation; and
   adding the new site to the cluster if the new unanchored delay variation does not exceed the MSA delay variation.

2. The media of claim 1, wherein the anchor path delay comprises one-way delay down (OWDd) and delay offset down from the host site to an anchored site and one-way delay up (OWDu) and delay offset up from the anchored site to the host site.

3. The media of claim 1, further comprising removing any unanchored small cell site from the cluster whose respective unanchored delay variation exceeds the MSA delay variation.

4. The media of claim 3, further comprising adding a Primary Reference Timing Clock (PRTC) that is traceable and synchronous to a common clock to at least one of the removed unanchored small cell sites to form a new cluster.

5. The media of claim 1, wherein the anchor path delay and the respective RT delay that are compared are measured simultaneously.

6. The media of claim 1, further comprising not adding the new site to the cluster if the new unanchored delay variation exceeds the MSA delay variation.

7. A method of adding and removing unanchored small cell sites for a cluster that delivers precision time protocol frequency and phase synchronization over a network without on-path support, the method comprising:
   continuously measuring, in an asymmetric network without on-path support, an anchor path delay, the anchor path delay comprising one-way delay down (OWDd) and delay offset down from a host site to an anchored site and one-way delay up (OWDu) and delay offset up from the anchored site to the host site;
   continuously measuring a respective round trip (RT) delay from the host site to each of a plurality of unanchored small cell sites;
   determining a respective unanchored delay variation by comparing the anchor path delay to each respective RT delay, the anchor path delay and the respective RT delay measurements taken at approximately the same time;
   determining a maximum standard allowable (MSA) delay variation; and
   adding unanchored sites to the cluster based on a comparison of the respective unanchored delay variation to the MSA delay variation, wherein unanchored sites are added to the cluster if the respective unanchored delay variation does not exceed the MSA delay variation.

8. The method of claim 7, wherein unanchored sites are not added to the cluster if the respective unanchored delay variation exceeds the MSA delay variation.

9. A computer system for adding and removing unanchored small cell sites for a cluster that delivers precision time protocol frequency and phase synchronization over a network without on-path support comprising:
   a processor; and
   a computer storage medium storing computer-useable instructions that, when used by the processor, cause the processor to:
   continuously measure, in an asymmetric network without on-path support, an anchor path delay comprising one-way delay down (OWDd) and delay offset down from a host site to an anchored site and one-way delay up (OWDu) and delay offset up from the anchored site to the host site, wherein each of the host site and the anchored site has a Primary Reference Timing Clock (PRTC) that is traceable and synchronous to a common clock;

determine a maximum standard allowable (MSA) delay variation for the cluster;

continuously measure a respective round trip (RT) delay from the host site to each unanchored small cell site in the cluster;

compare the anchor path delay to each respective RT delay to determine a respective unanchored delay variation;

identify a new unanchored site to add to the cluster;

continuously measure a new RT delay from the host site to the new unanchored site; and compare the anchor path delay to the new RT delay to determine a new unanchored delay variation.

10. The computer system of claim 9, wherein the new unanchored site is added to the cluster if the new unanchored delay variation does not exceed the MSA delay variation and the new unanchored site is not added to the cluster if the unanchored delay variation exceeds the MSA delay variation.

* * * * *